(12) United States Patent
Hunt et al.

(10) Patent No.: US 11,556,482 B1
(45) Date of Patent: Jan. 17, 2023

(54) SECURITY FOR ADDRESS TRANSLATION SERVICES

(71) Applicant: INTERNATIONAL BUSINESS MACHINES CORPORATION, Armonk, NY (US)

(72) Inventors: Guerney D. H. Hunt, Yorktown Heights, NY (US); Charles R. Johns, Austin, TX (US); Florian Auernhammer, Rueschlikon (CH); Charanjit Singh Jutla, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/490,723

(22) Filed: Sep. 30, 2021

(51) Int. Cl.
*G06F 12/14* (2006.01)
*G06F 12/0882* (2016.01)
*G06F 12/1045* (2016.01)

(52) U.S. Cl.
CPC ...... *G06F 12/1408* (2013.01); *G06F 12/0882* (2013.01); *G06F 12/1045* (2013.01); *G06F 12/1425* (2013.01)

(58) Field of Classification Search
None
See application file for complete search history.

(56) References Cited

U.S. PATENT DOCUMENTS

| | | | | |
|---|---|---|---|---|
| 6,145,064 A | * | 11/2000 | Long | G06F 12/1018 711/158 |
| 9,037,870 B1 | * | 5/2015 | Zheng | G06F 12/1466 380/42 |
| 10,558,537 B1 | | 2/2020 | Colgrove et al. | |
| 11,010,067 B2 | | 5/2021 | Durham | |
| 2006/0059553 A1 | * | 3/2006 | Morais | G06F 12/1408 711/E12.095 |
| 2007/0113102 A1 | * | 5/2007 | Glen | G06F 21/606 713/189 |
| 2011/0078359 A1 | * | 3/2011 | Van Dyke | G06F 12/0607 711/E12.078 |
| 2011/0099387 A1 | * | 4/2011 | Gremaud | G06F 12/1408 713/190 |
| 2012/0324141 A1 | * | 12/2012 | Seong | G06F 12/0238 711/3 |

(Continued)

OTHER PUBLICATIONS

Contact Center Enterprise Solution Security, Cisco; 2021.

(Continued)

*Primary Examiner* — Yaima Rigol
(74) *Attorney, Agent, or Firm* — Brian F. Russell; Jeffrey S. LaBaw

(57) ABSTRACT

A processor receives, from a requestor, a first request containing a virtual address. Based on the first request, the processor determines a real address corresponding to the virtual address, encrypts at least a portion of the real address to obtain a cryptographic secure real address, and returns the cryptographic secure real address to the requestor. Based on receiving a second request specifying a request address, the processor decrypts the request address to validate the request address as the cryptographic secure real address. Based on validating the request address as the cryptographic secure real address, the processor allows access to a resource of the data processing system identified by the real address.

23 Claims, 8 Drawing Sheets

(56) References Cited

U.S. PATENT DOCUMENTS

| | | | |
|---|---|---|---|
| 2013/0054934 A1* | 2/2013 | Mitsugi | G06F 12/109 |
| | | | 711/E12.016 |
| 2013/0254514 A1* | 9/2013 | Yu | G06F 12/0246 |
| | | | 711/209 |
| 2015/0106551 A1* | 4/2015 | Kim | G06F 12/0246 |
| | | | 711/103 |
| 2016/0092702 A1* | 3/2016 | Durham | G06F 9/35 |
| | | | 713/190 |
| 2016/0344731 A1* | 11/2016 | Serebrin | H04L 63/164 |
| 2019/0018800 A1* | 1/2019 | Jayasena | G06F 9/4856 |
| 2019/0095350 A1* | 3/2019 | Durham | G06F 12/145 |
| 2020/0004694 A1* | 1/2020 | Szubbocsev | G06F 21/79 |
| 2020/0026661 A1 | 1/2020 | Kounavis et al. | |
| 2020/0201638 A1* | 6/2020 | Gerzon | G06F 9/45558 |
| 2020/0201752 A1* | 6/2020 | Palmer | G06F 3/0629 |
| 2021/0149825 A1* | 5/2021 | Durham | G06F 12/1408 |
| 2021/0365569 A1* | 11/2021 | Chen | G06F 3/0604 |

OTHER PUBLICATIONS

Demystifying the Secure Enclave Processor, Mandt, T. et al.; 2020.

A PUF-Based Cryptographic Security Solution for IoT Systems on Chip, Balan, A. et al.; 2020.

IOQ-Based Differential Security Model for NVMe Storage System, Anonymously; May 7, 2021.

Support for Secure Virtual Machines and for Secure Applications Anonymously; Nov. 5, 2019.

Self-Contained Virtualization Infrastructure for Server-Centric Key Tokens and Stateless Cryptographic Modules, Anonymously; Feb. 21, 2013.

Mini Advanced Encryption Standard (Mini-AES): A Testbed for Cryptanalysis Students, Raphael Chung-Wei Phan; Published in Cryptologia, XXVI (4), 2002.

* cited by examiner

SECURITY FOR ADDRESS TRANSLATION SERVICES

BACKGROUND OF THE INVENTION

The present invention relates in general to data processing, and in particular, to input/output (I/O) security in a data processing system.

A data processing system may include multiple processing elements and multiple input/output adapters (IOAs) to support connections to communication networks, storage devices and/or storage networks, and peripheral devices. In such data processing systems, the hardware resources of the data processing system may be logically partitioned into multiple sets of resources, each controlled by a respective one of multiple possibly heterogeneous operating system instances. The operating systems concurrently execute on this common hardware platform in their respective logical partitions (LPARs) under the control of system firmware, which is commonly referred to as a virtual machine monitor (VMM) or hypervisor. Thus, the hypervisor allocates each LPAR a non-intersecting subset of the resources of the data processing system, and each operating system instance in turn directly controls its distinct set of allocable resources, such as regions of system memory and IOAs.

In general, the IOAs in a data processing system employ an I/O (or virtual) address space that is distinct from the real address space utilized to address system memory in the data processing system. Consequently, address translation is employed to translate addresses between the I/O address space and the real address space of the data processing system. In at least some older prior art data processing systems, all translations between the I/O address space and the real address space were performed on a processor chip. As a result, the I/O-to-real address translation process could be utilized to restrict IOAs to only the subset of real addresses they were permitted to access.

More recently, at least some I/O standards, such as Peripheral Component Interconnect Express (PCIe), have adopted an alternative address translation service (ATS) in which an IOA can request a translation for an I/O address and, in response, receive from a host bridge the corresponding real address. The IOA can then cache the real address in an address translation cache (ATC) and subsequently issue, to the host bridge, one or more memory access requests specifying the real address. Enabling IOAs to make memory access requests utilizing real addresses, while improving latency for accesses referencing frequently or recently accessed addresses, can expose the full system memory to access by a malicious or compromised I/O device, thus creating a significant security concern. At least some prior art systems partially ameliorate this security concern by performing real address validation on incoming I/O memory access requests to ensure that each IOA only accesses authorized real address pages. However, this address translation service implementation has poor performance and has proven to be expensive to implement in terms of the memory footprint required to store the table conventionally utilized to perform real address validation. These disadvantages are exacerbated in implementations in which the real address validation employs fine-grained validation, for example, based on both requestor identifier (RID) and Process Address Space Identifier (PASID).

SUMMARY OF THE INVENTION

In at least one embodiment, a data processing system provides improved I/O security while supporting address translation services for an attached device.

In various embodiments, the disclosed techniques can be implemented in a method, a data processing system, and/or a program product.

In at least one embodiment, a processor receives, from a requestor, a first request containing a virtual address. Based on the first request, the processor determines a real address corresponding to the virtual address, encrypts at least a portion of the real address to obtain a cryptographic secure real address, and returns the cryptographic secure real address to the requestor. Based on receiving a second request specifying a request address, the processor decrypts the request address to validate the request address as the cryptographic secure real address. Based on validating the request address as the cryptographic secure real address, the processor allows access to a resource of the data processing system identified by the real address. The use of a cryptographic secure real address provides improved security and generally requires a smaller footprint for implementation than table-based real address validation approaches.

In some embodiments, the requestor can be an input/output (I/O) adapter. For example, in one particular embodiment, the adapter may communicate requests with the processor utilizing the Peripheral Component Interconnect Express Address Translation Services (PCIe ATS) protocol. In other embodiments, the requestor can be an attached device, such as an accelerator, that employs a virtual address space.

In some embodiments, at least a portion of the real address is encrypted utilizing Advanced Encryption Standard (AES)-based encryption. In some embodiments, encrypting at least a portion of the real address alternatively or additionally includes generating a hash of the at least a portion of the real address. Utilizing a strong encryption technique such as AES has the advantage of improved security, and utilizing a hash has the advantage of high performance.

In some embodiments, the processor refrains from encrypting lower-order bits of the real address utilized to specify an address within a memory page. By not encrypting the full real address (e.g., 64 bits), encryption is simplified, and performance is improved.

In some embodiments, encryption can be further strengthened by combining additional data with the at least a portion of the real address prior to encryption. In some embodiments, the additional data can include bits from a process address space identifier of the requestor and/or bits from a requestor identifier. In some embodiments, the additional data can alternatively or additionally include a read-only field indicating whether access to the real address by the requestor is read-only. In some embodiments, the additional data can include a key generation field specifying which key among multiple keys was utilized to encrypt the real address.

DETAILED DESCRIPTION OF ILLUSTRATIVE EMBODIMENT

Figure 1:
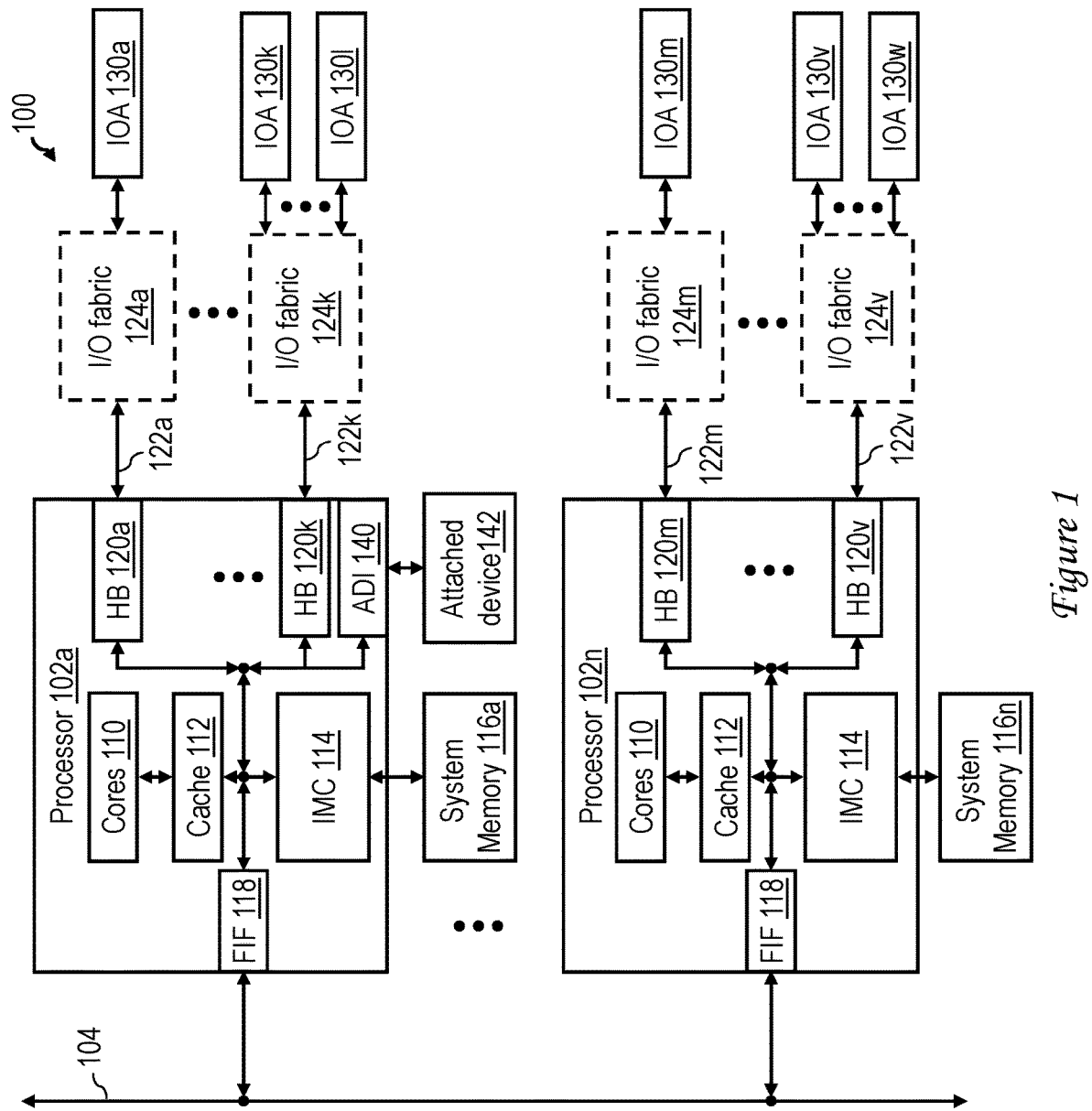
FIG. 1 is a high-level block diagram of an exemplary data processing system in accordance with one embodiment.

With reference now to the figures, and in particular with reference to FIG. 1, there is depicted a high-level block diagram of an exemplary data processing system 100 in accordance with one embodiment. In some embodiments, data processing system 100 may be, for example, a symmetric multiprocessor (SMP) system including a plurality of processors 102a-102n, each coupled for communication to a system fabric 104, which may include one or more bused or switched communication links. In alternative embodiments, a data processing system with a single processor 102 may be utilized.

In the depicted embodiment, each processor 102 is preferably realized as a single integrated circuit chip having a semiconductor substrate in which integrated circuitry is fabricated as is known in the art. As shown, each processor 102 includes a plurality of processor cores 110 that process data through the execution and/or processing of program code, which may include, for example, software and/or firmware and associated data, if any. This program code may include, for example, a hypervisor, one or more operating system instances to which the hypervisor may allocate logical partitions (LPARs), and application programs. Processor 102 further includes cache memory 112 providing one or more levels of relatively low latency temporary storage for instructions and data retrieved from lower levels of the data storage hierarchy. In addition, processor 102 includes an integrated memory controller (IMC) 114 that controls access to an associated one of off-chip system memories 116a to 116n. Processors 102 access system memories 116 utilizing real addresses (RAs) in a real address space. In various embodiments, real addresses may have differing lengths, such as 32 bits, 64 bits, etc.

Each processor 102 further includes a fabric interface (FIF) 118 by which processor 102 communicates with system fabric 104, as well as one or more (and preferably multiple) host bridges (HB) 120a-120k or 120m-120v supporting input/output communication with various input/output adapters (IOAs) 130a-130l or 130m-130w. IOAs 130 may be, for example, network adapters, storage device controllers, display adapters, peripheral adapters, etc. In their processing, IOAs 130 reference I/O addresses (also referred to as virtual addresses (VAs)) in a VA space. In various embodiments, VAs may have differing lengths, such as 32 bits, 40 bits, 48 bits, 52 bits, 64 bits, etc. The length of the VAs employed by IOAs 130 can be different (i.e., shorter or longer) than the length of the RAs employed by processors 102.

In various embodiments, host bridges 120 may be communicatively coupled to IOAs 130 either directly or indirectly. For example, in the illustrated embodiment, host buffers 120a, 120k, 120m, and 120v provide interfaces to local buses 122a, 122k, 122m, and 122v, respectively, to which IOAs 130 may be directly connected or indirectly coupled. Thus, IOA 130a is coupled to local bus 122a optionally through an I/O fabric 124a, which may comprise one or more switches and/or bridges. In a similar manner, IOAs 130k and 130l are coupled to local bus 122k optionally through an I/O fabric 124k, IOA 130m is coupled to local bus 122m optionally through I/O fabric 124m, and IOAs 130v and 130w are coupled to local bus 122v optionally through I/O fabric 124v. In some embodiments, communication on one or more of local buses 122 utilizes a known I/O bus standard, such as the Peripheral Component Interconnect (PCI) or PCI Express (PCIe) standard. In some embodiments, one or more of local buses 122 may employ an additional or alternative I/O bus standard.

As further depicted in FIG. 1, one or more of processors 102 (e.g., processor 102a) may further include an attached device interface (ADI) 140 supporting the attachment of an attached device 142. In some embodiments, attached device 142 may be, for example, an accelerator that enables the processor 102 to offload one or more processing functions, such as data encryption/decryption, data compression/decompression, matrix operations, data stream management, etc. In performing its processing, attached device 142 may also reference a VA space, which may be different than or the same as that utilized by IOAs 130.

Those of ordinary skill in the art will appreciate that the architecture and components of a data processing system can vary between embodiments. For example, other devices and interconnects may alternatively or additionally be used. Accordingly, the exemplary data processing system 100 given in FIG. 1 is not meant to imply architectural limitations with respect to the claimed inventions.

Figure 2:
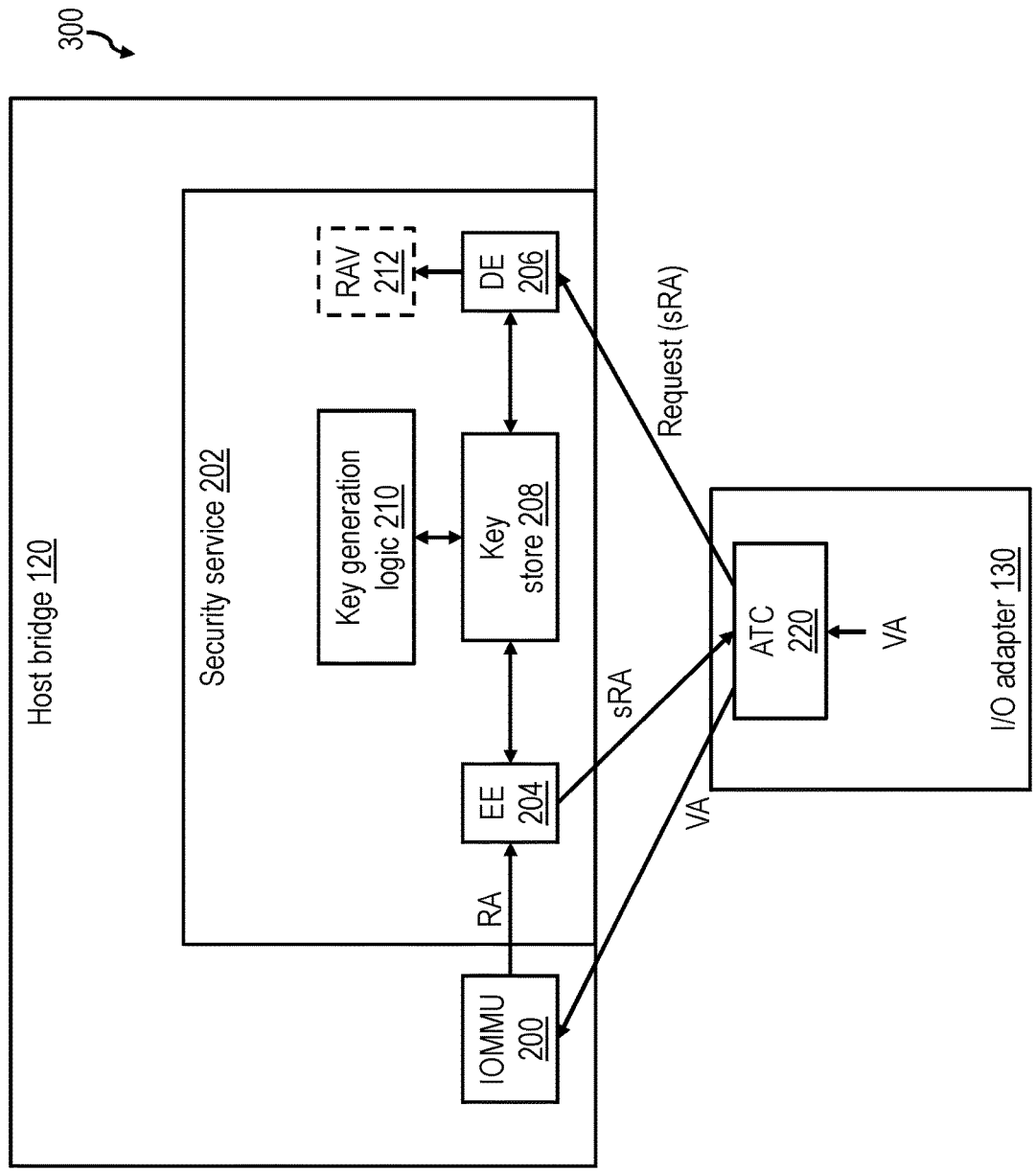
FIG. 2 is a more detailed block diagram of a host bridge and I/O adapter (IOA) in accordance with one embodiment.

Referring now to FIG. 2, there is depicted a more detailed block diagram of a host bridge 120 and I/O adapter 130 in accordance with one embodiment. In the depicted example, host bridge 120 includes an I/O memory management unit (IOMMU) 200 configured to provide translation of VAs referenced by a requestor, such as an IOA 130, into RAs that can be utilized to access system memories 116 (and possibly other memory-mapped resources) of data processing system 100. Host bridge 120 additionally includes security logic 202, which is configured to encrypt addresses communicated to requestors and to decrypt addresses received from requestors. In the illustrated embodiment, security logic 202 includes an encryption engine (EE) 204 for performing encryption to generate secure real addresses (sRAs), a decryption engine 206 for decrypting request addresses received in memory access requests, and a key store 208 for storing keys utilized in encryption and decryption. In at least some embodiments, host bridge 120 may utilize separate key(s) for each requestor it supports. For example, assuming host bridge 120 is a PCIe host bridge, host bridge 120 may implement respective key(s) for each PCIe requestor identifier (RID) or for each combination of RID and Process Address Space Identifier (PASID). In at least some embodiments, security logic 202 additionally includes key generation logic 210 for generating the encryption keys in key store 208, as well as optional real address validation (RAV) logic 212 for validating the real addresses of requests received by host bridge 120 from requestors.

FIG. 2 additionally illustrates that a requestor, such as an IOA 130, may include an address translation cache (ATC) 220. Address translation cache 220 may include a plurality of entries that associate recently and/or frequently accessed VAs with the corresponding secure RAs (sRAs) received from host bridge 120.

Although not specifically illustrated in FIG. 2, it should be appreciated that ADI 140 of FIG. 1 may be constructed similarly to host bridge 120. For example, ADI 140 may include an IOMMU 200 and security logic 202. Like IOA 130, an attached device 142 may also include an ATC 220 for caching VA-to-sRA translations obtained from ADI 140.

Figures 3, 4:
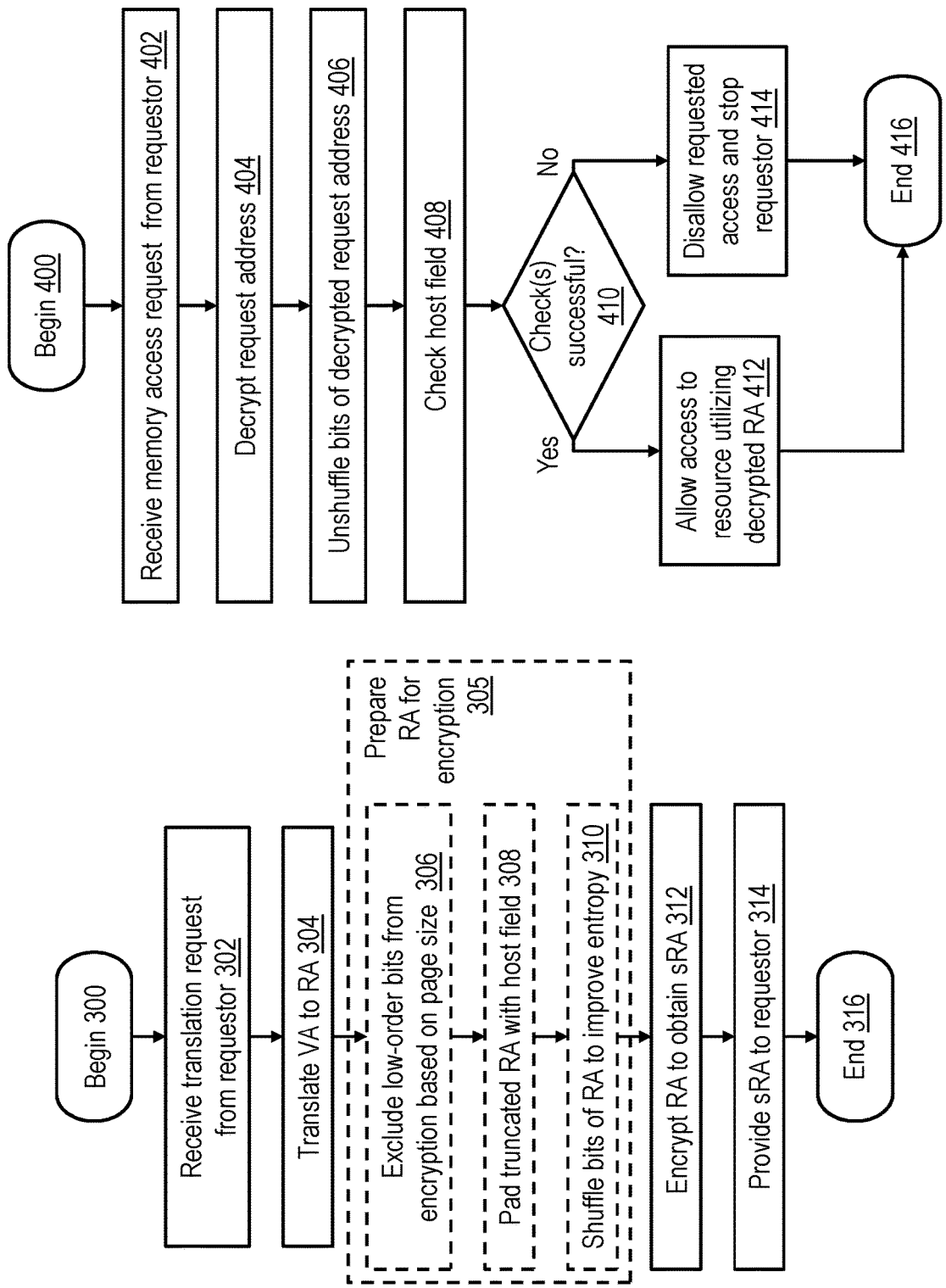
FIG. 3 is a high-level logical flowchart of an exemplary process by which a processor provides cryptographic secure real addresses (sRAs) to a requestor in accordance with one embodiment.
FIG. 4 is a high-level logical flowchart of an exemplary process by which a processor handles a memory access request of a requestor in accordance with one embodiment.

With reference now to FIG. 3, there is illustrated a high-level logical flowchart of an exemplary process by which a processor 102 provides cryptographic secure RAs (sRAs) to a requestor in accordance with one embodiment. In some implementations, the process of FIG. 3 may be performed by a host bridge 120 that provides cryptographic sRA to an IOA 130. The same process may alternatively or additionally be employed by an ADI 140 to provide sRAs to an attached device 142.

The process of FIG. 3 begins at block 300 and then proceeds to block 302, which illustrates a processor 102 receiving, from an associated requestor, a translation request specifying a virtual address to be translated. In some embodiments, the translation request may be, for example, a PCIe ATS translation request. In response to receipt of the translation request, the processor 102 translates the VA to an RA in the real address space of data processing system 100, for example, utilizing IOMMU 200. From block 304, the process proceeds to optional block 305, which illustrates processor 102 preparing the RA for encryption. In the illustrated embodiment, the preparation of the RA for encryption at block 305 includes multiple steps, including excluding from the encryption a number of low-order bits of the RA utilized to specify a particular address within a given memory page (block 306). For example, assuming that RAs are 64 bits in length and processor 102 allocates 2 MB memory pages to the requestor, 21 low order bits of the RA are excluded from encryption at block 306. As will be appreciated, the encryption process is simplified and encryption performance is improved if processor 102 refrains from encrypting all bits of the RA. At block 305, optionally pads the truncated RA with a host field including one or more additional bits (block 308). Differing embodiments of a host field are described below with reference to FIGS. 5A and 6. In addition, at block 305, processor 102 may shuffle bits of the RA to generally increase the entropy (or randomness) of the bit values (block 310). In preferred embodiments, at block 310, bit positions are rearranged in the intermediate RA in a fixed, predetermined manner.

The process of FIG. 3 proceeds from block 305 to block 312, which illustrates processor 102 encrypting the RA (either that received from IOMMU 200 or, if block 305 is implemented, the intermediate RA obtained following block 305) to obtain a cryptographic secure RA (SRA). In some embodiments, the encryption depicted at block 312 can include encryption engine 204 performing a hash of the RA. Suitable hash functions can include, for example, SHA-1, SHA-256, or MD-5. In other embodiments, the encryption may alternatively or additionally include encryption engine 204 encrypting the RA utilizing one or more keys. If key-based encryption is performed, it is preferred if encryption engine 204 utilizes different key(s) for each requestor (or for each combination of RID and PASID). Embodiments of possible encryption algorithms that may be employed are described below with reference to FIGS. 7 and 10. The processor then provides the sRA generated by the encryption performed at block 312 to the requestor (block 314). In at least some embodiments, the processor 102 can communicate the sRA to the requestor in a PCIe ATS translation response. In response to receipt of the sRA, the requestor can cache the VA-to-sRA translation (e.g., in ATC 220) to facilitate future use of the sRA in a memory access request. Following block 314, processing of the translation request by the processor 102 ends at block 316.

Referring now to FIG. 4, there is depicted a high-level logical flowchart of an exemplary process by which a processor 102 handles a memory access request of a requestor in accordance with one embodiment. In some implementations, the process of FIG. 4 may be performed by a host bridge 120 that receives the memory access request from an IOA 130. The same process may alternatively or additionally be performed by an ADI 140 in response to receipt of a memory access request from an attached device 142.

The process begins at block 400 and then proceeds to block 402, which illustrates the processor 102 receiving, from a requestor, a memory access request, such as an IOA 130 or attached device 142. The memory access request, which may generally be a read-type request that requests return of data or a write-type request that requests an update to data, specifies a request address to be accessed. In the case that the requestor is not a malicious or compromised device, the request address will be a sRA, which would have been previously provided by processor 102 to the requestor by the process of FIG. 3. However, in the case that the requestor is a malicious or compromised device, the request address may be an illegal address or a real address outside of the real address range(s) that that the requestor is authorized to access.

In response to receipt of the memory access request, processor 102 decrypts the request address (block 404). For example, if encryption engine 204 generates sRAs utilizing a hash function, decryption engine 206 may decrypt the request address at block 404 utilizing a corresponding inverse hash function. Alternatively, if encryption engine 204 generates sRAs utilizing a key-based encryption function, decryption engine 206 may decrypt the request address at block 404 utilizing the same key(s) as were utilized to encrypt the sRA. Again, decryption engine 206 may access the relevant key(s) in key store 208 based on the identity of the requestor (or the combination of RID/PASID), which is preferably communicated by the requestor in or in conjunction with the memory access request or partially or fully implied by the location of the requestor on the connecting PO bus. Assuming that bits of the intermediate RA were shuffled at block 310 of FIG. 3, processor 102 also unshuffles bits of the decrypted request address to reverse the reordering of bit positions made at block 310 (block 406).

At block 408, processor 102 checks at least a portion of the decrypted request address to determine whether or not the decrypted request address is a valid RA. For example, in embodiments in which processor 102 adds a host field to pad RAs at block 308 of FIG. 3, security logic 202 of processor 102 may determine at block 408 whether or not the host field of the decrypted request address matches the host field added to the RA at block 308. The check made at block 408 may alternatively or additionally include RAV logic 212 performing a real address validation of some or all of the RA bits of the decrypted request address. At block 410, processor 102 determines whether or not the check(s) performed at block 408 was or were all successful. Based on a determination at block 410 that the check or checks performed at block 408 were all successful, the request address is confirmed to be a proper sRA, and processor 102 allows access to the resource in data processing system 100 (e.g., a location in system memory 116) identified by the decrypted RA (block 412). If, however, processor 102 determines at block 410 that one or more of the checks performed at block 410 were not successful, processor 102 disallows the requested access to the resource, if any, of data processing system 100 identified by the decrypted request address (block 414). In addition, at block 414, processor 102 stops the operation of the requestor to terminate the generation of potentially malicious memory access requests by the requestor. Processor 102 may also optionally reset (restart) the requestor to restore the requestor to a known, stable state from which the requestor will again be permitted to issue memory access requests. Following either block 412 or block 414, the process of FIG. 4 ends at block 416.

Figure 5A:
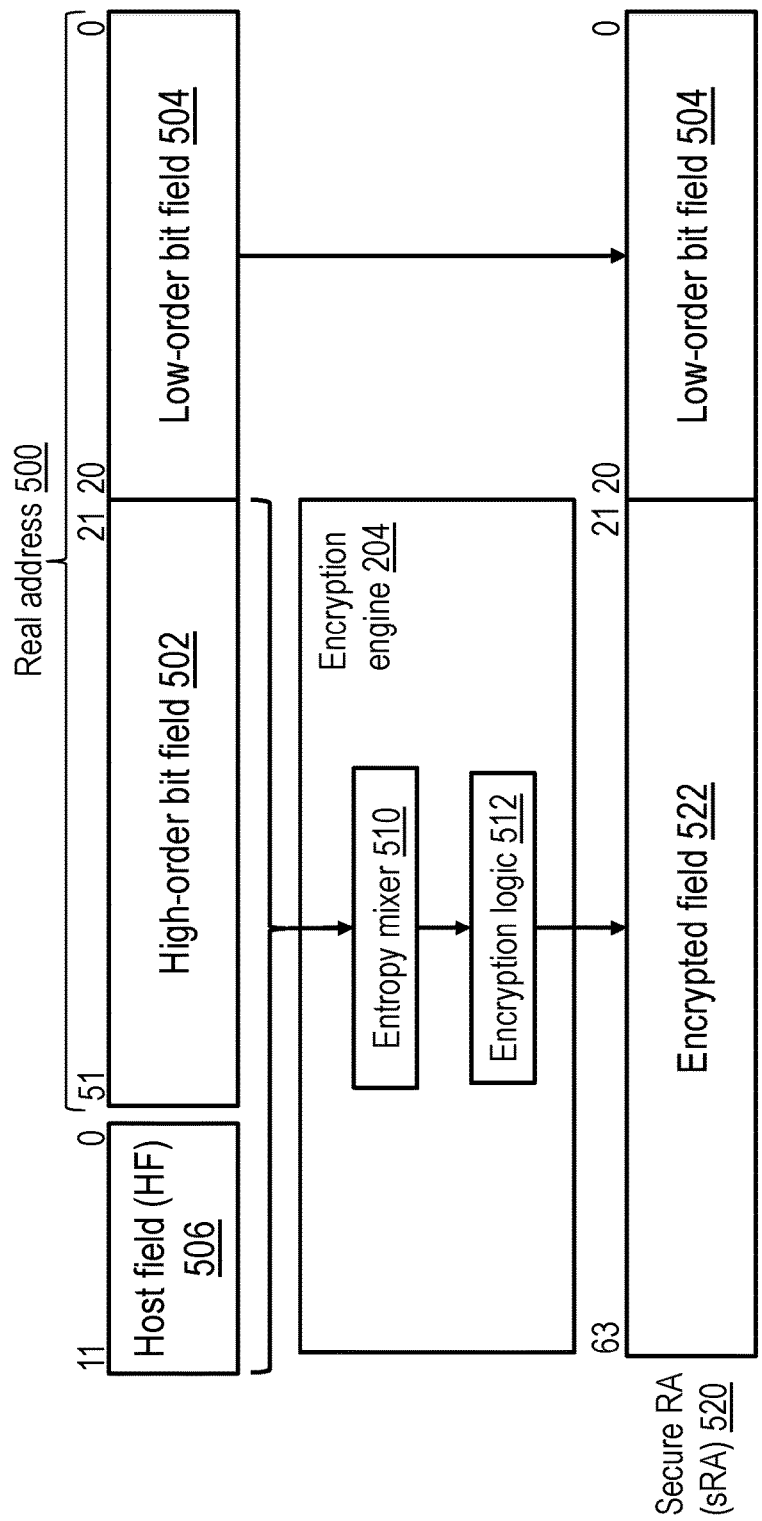
FIGS. 5A-5B illustrate encryption of a real address to obtain a secure real address and decryption of a secure real address to obtain the original real address in accordance with one embodiment.

With reference now to FIG. 5A, there is illustrated an exemplary process by which a processor 102 encrypts a real address (RA) to obtain a secure real address (sRA) in accordance with one embodiment. In the depicted example, security logic 202 receives a RA 500 from IOMMU 200. In the depicted example in which processor 102 supports 64-bit real addressing, RA 500 may include a fewer number of bits, such as, 52 bits. The length of RA reflects the fact that I/O requestors, such as IOAs 130 and attached devices 142, generally have no need to address (or are restricted from addressing) the full RA space of data processing system 100. RA 500 includes a high-order bit field 502 and a low-order bit field 504. In the depicted example, the boundary between high-order bit field 502 and low-order bit field 504 is selected to correspond to the size of memory pages allocated (e.g., by operating system or hypervisor software) to the associated requestor. In this example, the 21-bit length of low-order bit field corresponds to a memory page size of 2 MB. As illustrated, processor 102 preferably refrains from encrypting the contents of low-order bit field as a requestor accessing or modifying the contents of one of its own allocated memory pages is, by definition, not a security threat. By excluding low-order bit field 504 from encryption, the encryption performed by encryption engine 204 is simplified and encryption performance is improved.

Figure 6:
FIG. 6 depicts contents of an exemplary host field of a real address in accordance with one embodiment.

As discussed above with reference to block 308 of FIG. 3, security logic 202 can pad the truncated RA 500 (now including only high-order bit field 502) with a desired number of bits comprising a host field (HF) 506 to obtain a desired number of bits for encryption. For example, in the illustrated example, host field 506 is selected to be 12 bits in length so that the intermediate RA has an overall length of 43 bits. In other embodiments, a greater or lesser number of bits can be included in host field 506. In various embodiments, a variety of different information may be encoded within host field 506. For example, FIG. 6 depicts an exemplary embodiment in which host field 506 includes a translation context field 600 in which processor 102 records a translation context for the VA-to-sRA translation. For example, in an embodiment in which processor 102 and the requestor communicate utilizing the PCIe ATS protocol, the translation context may include bits from the RID and/or PASID associated with the VA-to-sRA translation. In one specific example, translation context field 600 includes a concatenation of the relevant RID and PASID. FIG. 6 further illustrates that processor 102 may optionally include in host field 506 a read-only (RO) field 602 specifying whether or not RA 500 maps to memory page identified, for example, in page protection information maintained in IOMMU 200, as a read-only memory page. In embodiments in which host field 506 includes a RO field 602, security logic 202 may include in the checks performed at block 408 a check of whether the memory access request is a write-type request and RO field 602 is set to indicate a read-only memory page. In such a case, security logic 202 fails the check at block 410 of FIG. 4. In some embodiments, host field 506 may alternatively or additionally include a key generation field, as discussed further below with reference to FIGS. 8-9.

Returning to FIG. 5A, following the padding of high-order bit field 502 with host field 506, an entropy mixer 510 within encryption engine 204 may optionally reorder at least some of the bit positions of the 43-bit intermediate RA to increase entropy. In general, this bit position reordering includes distributing the lower-order bits of high-order bit field 502, which tend to have higher variability in bit values between RAs, among the 43 bit positions of the intermediate RA. The intermediate RA is then encrypted by encryption logic 512 within encryption engine 204 to obtain a 43-bit encrypted field 522. Encrypted field 522 is concatenated with the unencrypted 21-bit low-order bit field 504 to form a cryptographic sRA 520, which processor 102 can safely return to a requestor without exposing the actual corresponding RA to discovery by the requestor.

Figure 5B:
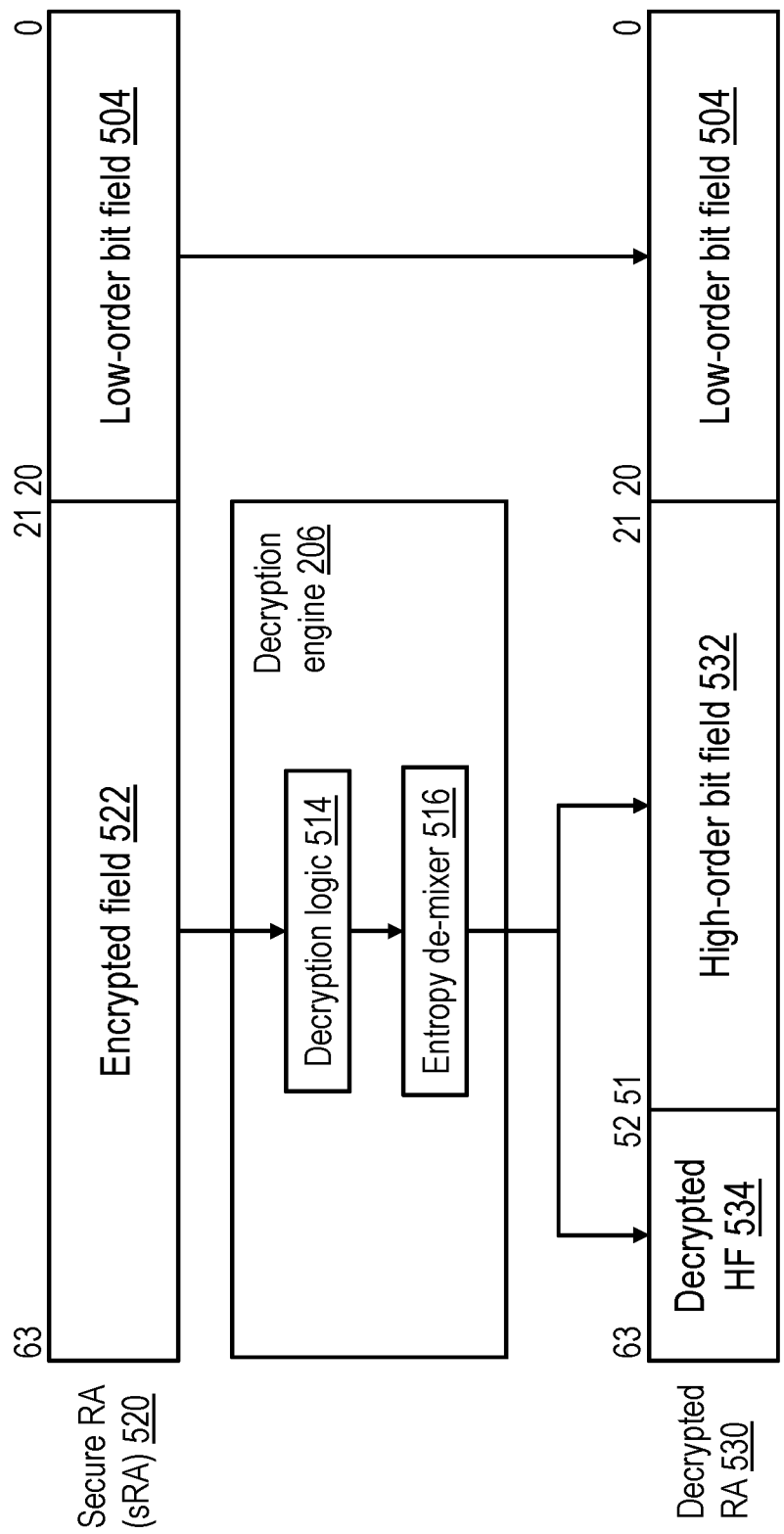

With reference now to FIG. 5B, there is illustrated an exemplary process of decryption of a sRA 520 to obtain the corresponding real address in accordance with one embodiment. In response to receipt of a sRA 520 returned to security logic 202, for example, in a memory access request, decryption logic 514 within decryption engine 206 decrypts encrypted field 522. An entropy de-mixer 516 within decryption engine 206 reverses the shuffling of the bits performed by entropy mixer 510 to obtain a high-order bit field 532 and decrypted host field 534, which together with low-order bit field 504, form a decrypted RA 530. As noted above with respect to blocks 408 and 410 of FIG. 4, security logic 202 can check decrypted host field 534 to determine if decrypted real address 530 is an authorized real address for the requestor. Further, security logic 202 can alternatively or additionally check RA bits found in high-order bit field 532 and low-order bit field 504 utilizing RAV logic 212.

Figure 7:
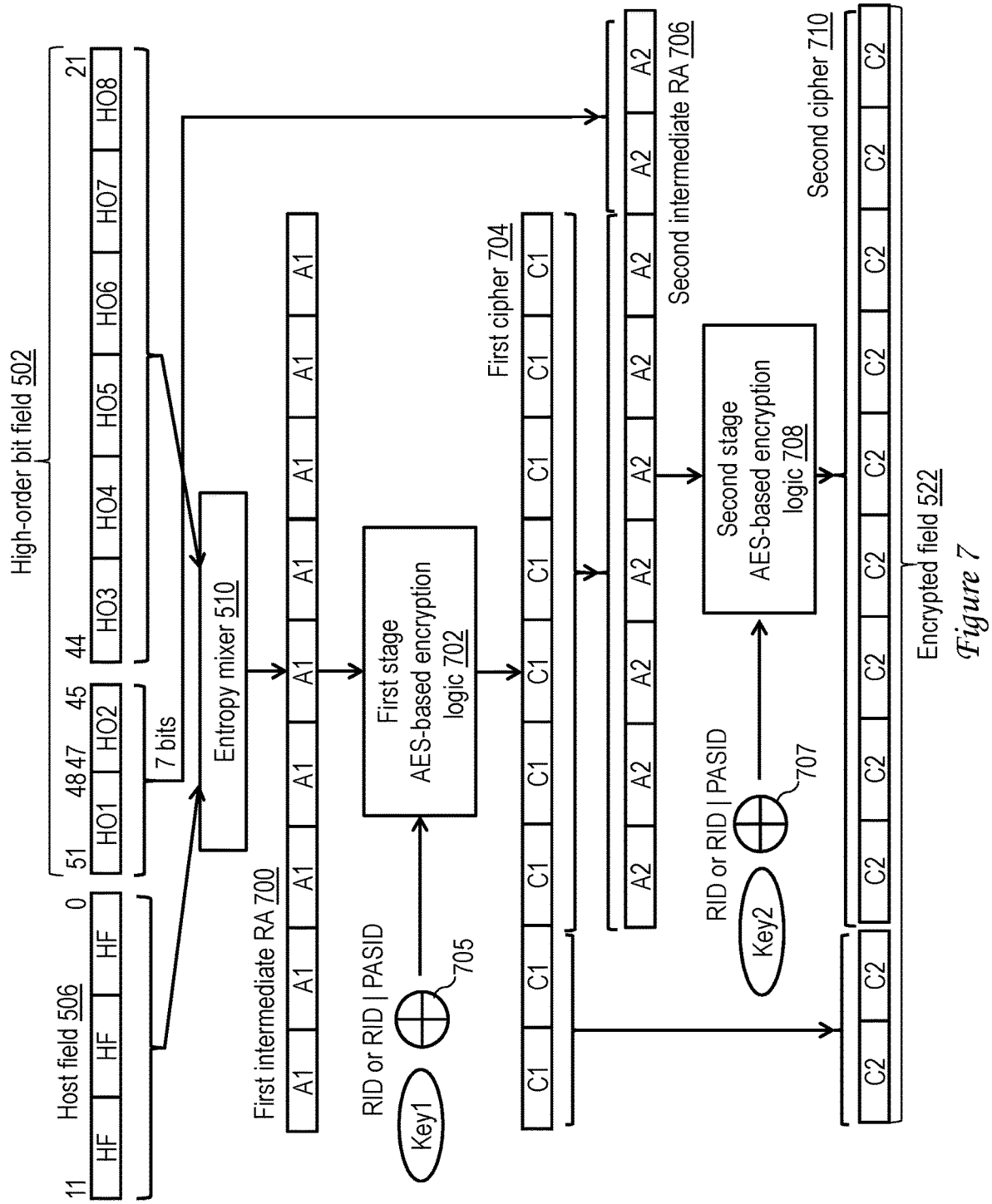
FIG. 7 is a high-level data flow diagram of an exemplary process for encrypting a real address to obtain a cryptographic secure real address in accordance with one embodiment.

With reference now to FIG. 7, there is illustrated a high-level data flow diagram of an exemplary process by which a processor 102 can encrypt a real address to obtain a cryptographic secure real address (sRA) in accordance with one embodiment. In particular, FIG. 7 illustrates a two-stage key-based encryption process that is but one of a myriad of possible techniques of encryption that can be applied by encryption engine 204; in other embodiments, other encryption techniques can alternatively be employed.

In the depicted encryption technique, the 31-bit high-order bit field 502 of FIG. 5A is divided into 8 nibbles labeled, from highest order to lowest order, as HO1 to HO8 (with HO2 being a short nibble including only 3 bits). In this example, nibbles HO1 and HO2 are reserved for the second stage of encryption and are not processed through entropy mixer 510. The bit positions of the remaining 36 bits (3 nibbles of host field 506 and 6 nibbles of high-order bit field 502) are mixed in a predetermined pattern by entropy mixer 510 to produce a 36-bit first intermediate RA 700 illustrated as nine 4-bit nibbles.

Encryption engine 204 encrypts intermediate RA 700 (and the seven bits of high-order bit field 502) in two stages. In the first stage, encryption engine 204 logically combines a first encryption key ("Key1") with additional data to obtain a modified first encryption key. In the depicted example, this additional data is a requestor-related identifier, such as the RID or a concatenation of the RID and PASID associated with the address translation request. In the illustrated example, encryption engine 204 logically combines with first encryption key and additional data utilizing an exclusive OR (XOR) operation 705. Encryption engine 204 then encrypts the intermediate RA 700 utilizing the modified first encryption key, for example, utilizing first stage Advanced Encryption Standard (AES)-based encryption logic 702. In some examples, the AES-based encryption scheme implemented by first stage AES-based encryption logic 702 can be a mini-AES-based encryption scheme that employs a 36-bit key. One example of such a mini-AES-based encryption scheme is described below with reference to FIG. 10. The output of first stage AES-based encryption logic 702 is a 36-bit first cipher 704, illustrated as nine 4-bit nibbles.

Encryption engine 204 reserves the seven highest-order bits of first cipher 704 for later use. Encryption engine 204 forms a second intermediate RA 706 by concatenating the 29 lower-order bits of first cipher 204 with nibbles HO1 and HO2 reserved from high-order bit field 502.

In a second stage of encryption, encryption engine 204 logically combines (e.g., utilizing an XOR operation 707) a second encryption key ("Key2") with additional data to obtain a modified second encryption key. As above, this additional data can be a requestor-related identifier, such as the RID or a concatenation of the RID and PASID associated with the address translation request. Encryption engine 204 then encrypts the second intermediate RA 706 utilizing the modified second encryption key (e.g., a 36-bit key), for example, utilizing second stage AES-based encryption logic 708. In some examples, second stage AES-based encryption logic 708 can be identical to first stage AES-based encryption logic 702 and/or can reuse the same circuitry. The output of second stage AES-based encryption logic 708 is a 36-bit second cipher 710, illustrated as nine 4-bit nibbles. Encryption engine 204 can then form the 43-bit encrypted field 522 of the sRA 520 by concatenating the 7 highest-order bits of first cipher 704 that were reserved following the first stage of encryption with the 36-bit second cipher 710. As illustrated in FIG. 5A, security logic 202 then appends the unencrypted 21-bit low-order bit field 504 to encrypted field 522 to form the full 64-bit sRA 520.

Figure 8:
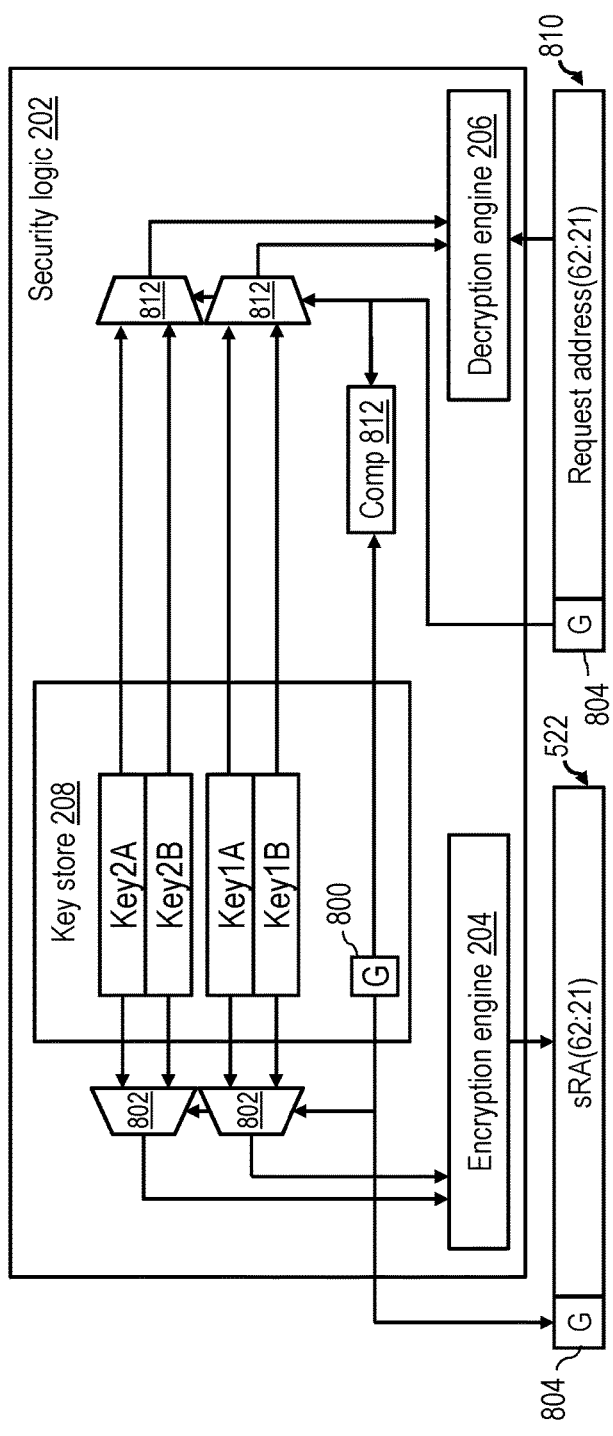
FIG. 8 is a partial view illustrating portions of the security logic of a processor supporting use of key generations in accordance with one embodiment.

Referring now to FIG. 8, there is depicted a partial view of security logic 202 of FIG. 2 illustrating portions thereof supporting use of key generations in accordance with one embodiment.

Over time, a hypervisor or operating system instance responsible for allocating memory pages in the real address space of data processing system 100 will re-allocate various memory pages to different processes and/or different logical partitions (LPARs). As the memory pages are reallocated, the processor 102 will generally invalidate the corresponding translation entries in its IOMMU 200 and in the ATCs 220 of its attached requestors, for example, by sending translation invalidation requests. If a requestor receiving a translation invalidation request is not malicious and is bug-free, the requestor will invalidate each indicated translation in its ATC 220 pursuant to the translation invalidation request of the processor 102. However, if a requestor is malicious or compromised, the requestor may not invalidate a translation in its ATC 220 in response to a translation invalidation request and may instead retain a stale sRA and attempt to subsequently re-use the stale sRA to try to access portions of the real address space not currently allocated to that requestor.

In at least some embodiments, security logic 202 is configured to transparently update usage of encryption keys in key store 208 to prevent malicious or compromised requestors from being able to successfully re-use stale sRAs. In the embodiment of FIG. 8, security logic 202 preferably implements a respective generation (G) field 800 in association with the encryption keys assigned to each supported requestor. Generation field 800 specifies which generation of encryption keys is to be utilized. For example, assuming only two encryption key generations (e.g., denoted as key generations A and B) are supported, key store 208 may include, for each supported requestor, a Key1 and Key2 for each of key generations A and B. Thus, key store 208 includes, for a given requestor, keys Key1A and Key2A for use during key generation A and keys Key1B and Key2B for use during key generation B.

With this arrangement, at some point in time, generation field 800 will have a value of b'0', signifying, for example, key generation A. Consequently, security logic 202 will select (e.g., utilizing multiplexers 802) Key1A and Key2A for use by encryption engine 204 in generating encrypted field 522 of sRAs 520. At a different time, generation field 800 will have a value of b'1', signifying, for example, key generation B. Based on generation field 800 indicating key generation B, security logic 202 will select (e.g., utilizing multiplexers 802) Key1B and Key2B for use by encryption engine 204 in generating encrypted field 522 of sRAs 520. In either case, the value of generation field 800 is placed in a generation field 804 appended to a cipher output by encryption engine 204 to obtain the encrypted field 522 of sRA 520. It should be noted that in the illustrated embodiment, encryption engine 204 is configured to generate a 42-bit cipher rather than the 43-bit second cipher 710 of FIG. 7. In at least one implementation, this result can be achieved by decreasing a length of host field 506 from 12 bits to 11 bits.

In response to receipt, from a requestor, of a request address 810 in conjunction with a memory access request, security logic 202 selects (e.g., utilizing multiplexers 812) the key(s) to be utilized in decrypting request address 810 based on the generation field 804 of request address 810. Security logic additionally preferably includes a comparator 812 to detect whether the key generation specified by generation field 804 of request address 810 remains a valid key generation and, if not, to cause security logic 202 to reject the request address 810 as spurious.

Figure 9:
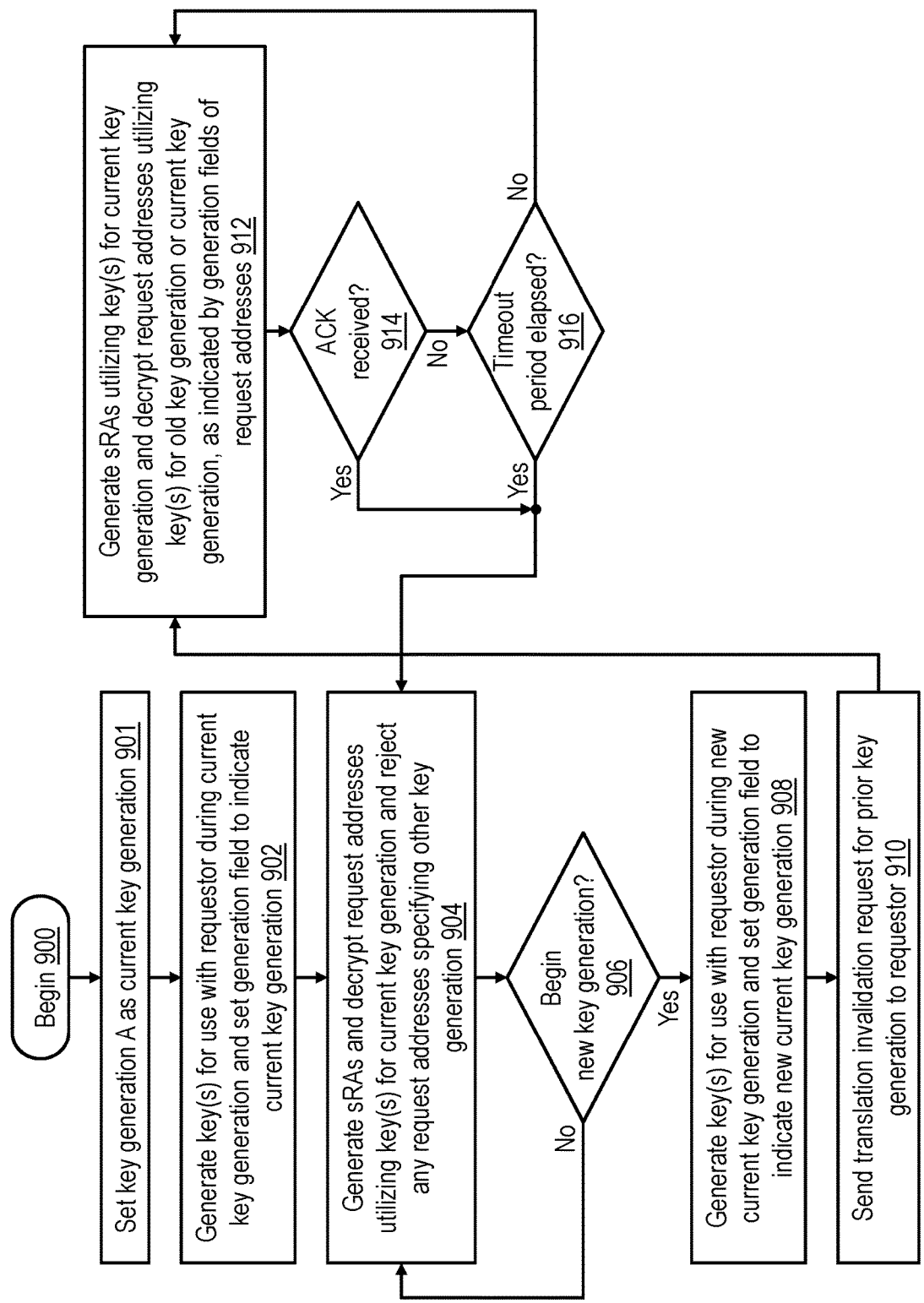
FIG. 9 is a high-level logical flowchart of an exemplary process by which a processor implements key generations in accordance with one embodiment.

With reference now to FIG. 9, there is illustrated a high-level logical flowchart of an exemplary process by which a processor 102 implements key generations in accordance with one embodiment. For ease of understanding, the process given in FIG. 9 is described with reference to the implementation of security logic 202 depicted in FIG. 8, which employs two alternating key generations referred to as key generations A and B.

As shown, the process of FIG. 9 begins at block 900 and then proceeds to block 901, which illustrates security logic 202 of processor 102 initializing the current key generation as key generation A. The process then proceeds to block 902, which illustrates security logic 202 generating two different keys (e.g., Key1A and Key2A) for use in generating sRAs 520 for a requestor during the current key generation (e.g., key generation A). For example, security logic 202 may generate the keys using key generation logic 210, such as a linear-feedback shift register (LFSR) or AES key generation logic. In addition, at block 902, security logic 202 sets generation field 800 to a value of b'0' to signify that key generation A is the current key generation applicable to the requestor. While key generation A remains the current key generation, encryption engine 204 and decryption engine 206 of security logic 202 utilize the keys associated with generation A, namely, Key1A and Key2A, to generate sRAs 520 transmitted to the requestor and to decrypt request addresses received from the requestor and rejects request addresses generated with keys for key generation B (block 904).

At decision block 906, processor 102 determines whether or not to use a new key generation for the requestor. For example, in some embodiments or use cases, processor 102 may determine to utilize a new key generation based, at least in part, on the remapping of some or all of the address space previously allocated to the requestor (or an LPAR to which the requestor is allocated). In some embodiments or use cases, processor 102 may determine to begin a new key generation for a requestor based, at least in part, on a software command. In some embodiments or use cases, processor 102 may determine a frequency of change of key generation based, at least in part, on attributes of the encryption algorithm employed by encryption engine 204. If processor 102 does not make an affirmative determination at block 906, the process returns to block 904, which has been described. If, however, processor 102 makes an affirmative determination at block 906, the process proceeds to block 908, which illustrates security logic 202 of processor 102 generating two different keys (e.g., Key1B and Key2B) for use in generating sRAs 520 for a requestor during a new current key generation (e.g., key generation B). As above, security logic 202 may generate the keys using key generation logic 210. In addition, at block 908, security logic 202 sets generation field 800 to the value associated the current key generation applicable to the requestor (e.g., a value of b'1' for key generation B). Security logic 202 additionally sends to the requestor a translation invalidation request for all sRAs in the prior key generation (e.g., key generation A), which are designated, for example, by the value specified in generation field 804 (block 910). In response to the translation invalidation request, a requestor that is not malicious or compromised will invalidate any VA-to-sRA translation in its ATC 220 that references a sRA generated during the prior key generation (e.g., key generation A).

As indicated by blocks 912-916, following issuance of the translation invalidation request and until an acknowledgement of the requested invalidation is received from the requestor (block 914) or a timeout period has elapsed (block 916), security logic 202 exclusively utilizes the keys for the current key generation (e.g., key generation B) to generate sRAs, but utilizes keys for generation A or generation B to decrypt request addresses. By continuing to support request addresses in the prior key generation (e.g., key generation A) until the invalidation is acknowledged or the timeout period elapses, security logic 202 ensures a seamless and transparent transition between key generations from the perspective of the requestor. In response to receipt by security logic 202 of the invalidation acknowledgement or elapsing of the timeout period, the process returns to block 904. As a result, encryption engine 204 and decryption engine 206 of security logic 202 utilize only the keys associated with the current key generation (e.g., Key1B and Key2B of key generation B) to generate sRAs 520 transmitted to the requestor and to decrypt request addresses received from the requestor. In addition, security logic 202 rejects any incoming request address specifying the non-current key generation in generation field 804 based on comparator 812 detecting a mismatch between the contents of generation fields 800 and 804. In this manner, security logic 202 prevents re-use of any stale sRAs that should have been invalidated by the requestor in response to the translation invalidation request issued at block 910. Following block 904, the process given in FIG. 9 continues at block 906 and following blocks, which have been described. In at least some embodiments, in response to a determination at block 916 that the timeout period has elapsed without receipt of an acknowledgement by the requestor of the invalidation of the sRAs for the prior key generation, processor 102 can additionally reset the requestor.

Figure 10:
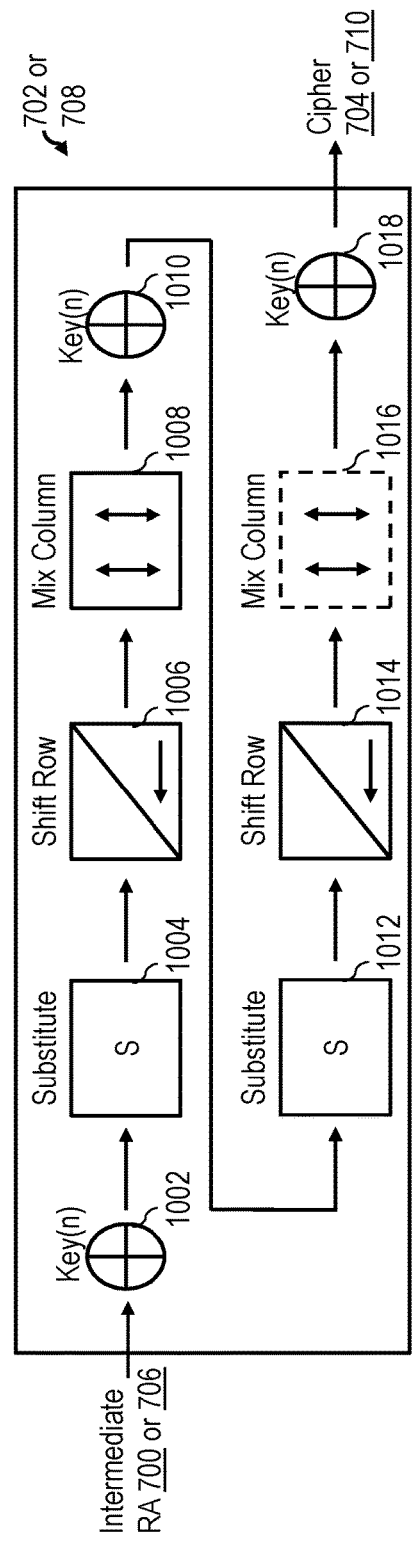
FIG. 10 is a data flow diagram of an exemplary AES-based encryption process that may be utilized to generate a cryptographic secure real address in accordance with one embodiment.

Referring now to FIG. 10, there is depicted a data flow diagram of an exemplary AES-based encryption process that may be utilized in the generation of sRAs 520 in accordance with one embodiment. Specifically, the depicted example illustrates a modified mini-AES encryption process that may be performed by first stage AES-based encryption logic 702 or second stage AES-based encryption logic 708. In the depicted embodiment of FIG. 10, Key(n) is either the output of the exclusive OR 705 or 707 of FIG. 7.

In a first round of the modified mini-AES encryption process, encryption engine 204 first logically combines a 36-bit intermediate RA 700 or 706 with a 36-bit modified Key(n), for example, by performing an XOR operation 1002. The resulting 36-bit working value is then placed in matrix, for example, a 3×3 matrix of in which each matrix entry holds one of nine nibbles. The contents of the matrix may then be subject to conventional matrix manipulation, including via a substitution step 1004, a row shifting step 1006, and a column mixing step 1008.

In a second round of the modified mini-AES encryption process 1000, encryption engine 204 again logically combines the 36-bit working value with 36-bit modified Key(n), for example, by performing an XOR operation 1010. The resulting 36-bit working value is then subjected to another round of matrix manipulation, including a substitution step 1012, a row shifting step 1014, and an optional column mixing step 1016. It should be noted that column mixing step 1016 is not performed in a conventional mini-AES encryption process and serves to further protect the sRA. The 36-bit value resulting from the illustrated processing can then be utilized as cipher 704 or 710 as previously described in FIG. 7.

As has been described, in at least one embodiment, a data processing system provides improved I/O security while supporting address translation services for an attached device.

In at least one embodiment, a processor receives, from a requestor, a first request containing a virtual address. Based on the first request, the processor determines a real address corresponding to the virtual address, encrypts at least a portion of the real address to obtain a cryptographic secure real address, and returns the cryptographic secure real address to the requestor. Based on receiving a second request specifying a request address, the processor decrypts the request address to validate the request address as the cryptographic secure real address. Based on validating the request address as the cryptographic secure real address, the processor allows access to a resource of the data processing system identified by the real address. The use of a cryptographic secure real address provides improved security and generally requires a smaller footprint for implementation than table-based real address validation approaches.

In some embodiments, the requestor can be an input/output (I/O) adapter. For example, in one particular embodiment, the adapter may communicate requests with the processor utilizing the Peripheral Component Interconnect Express Address Translation Services (PCIe ATS) protocol.

In other embodiments, the requestor can be an attached device, such as an accelerator, that employs a virtual address space.

In some embodiments, at least a portion of the real address is encrypted utilizing Advanced Encryption Standard (AES)-based encryption. In some embodiments, encrypting at least a portion of the real address alternatively or additionally includes generating a hash of the at least a portion of the real address. Utilizing a strong encryption technique such as AES has the advantage of improved security, and utilizing a hash has the advantage of high performance.

In some embodiments, the processor refrains from encrypting lower order bits of the real address utilized to specify an address within a memory page. By not encrypting the full real address (e.g., 64 bits), encryption is simplified, and performance is improved.

In some embodiments, encryption can be further strengthened by combining additional data with the at least a portion of the real address prior to encryption. In some embodiments, the additional data can include bits from a process address space identifier of the requestor and/or bits from a requestor identifier. In some embodiments, the additional data can alternatively or additionally include a read-only field indicating whether access to the real address by the requestor is read-only. In some embodiments, the additional data can include a key generation field specifying which key among multiple keys was utilized to encrypt the real address.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the appended claims. For example, although examples of addresses and address fields of specific lengths have been discussed, those skilled in the art should appreciate that the inventions described herein are not limited to the exemplary address and address field lengths. In addition, it is important to note that the described inventions may be employed in both virtualized and non-virtualized environments. For example, in various embodiments or use cases, the requestor can be assigned to a VM, a hypervisor, or a bare metal OS. Further, although aspects have been described with respect to a data processing hardware that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude signal media per se, transitory propagating signals per se, and energy per se.

The figures described above and the written description of specific structures and functions are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of data processing in a data processing system including a processor, the method comprising:
   the processor receiving, from a requestor, a first request containing a virtual address;
   based on the first request, the processor determining a real address corresponding to the virtual address, encrypting at least a portion of the real address to obtain a cryptographic secure real address, and returning the cryptographic secure real address to the requestor, wherein the encrypting includes:
     the processor maintaining a key generation field specifying a current key generation among a plurality of different key generations, said maintaining including repetitively cycling the key generation field through the plurality of different key generations over time;
     based on the current key generation specified by the key generation field, the processor selecting one of a plurality of different keys for use in the encrypting;
     the processor advancing the key generation field to specify a new key generation following the current key generation based on remapping of a virtual address space containing the virtual address;
   based on receiving a second request specifying a request address, the processor decrypting the request address to validate the request address as the cryptographic secure real address; and
   based on validating the request address as the cryptographic secure real address, the processor allowing access to a resource of the data processing system identified by the real address.

2. The method of claim 1, wherein the receiving a first request includes receiving a Peripheral Component Interconnect Express Address Translation Services (PCIe ATS) protocol request.

3. The method of claim 1, wherein encrypting at least a portion of the real address includes encrypting said at least a portion of the real address utilizing Advanced Encryption Standard (AES)-based encryption.

4. The method of claim 1, wherein encrypting at least a portion of the real address includes generating a hash of said at least a portion of the real address.

5. The method of claim 1, wherein encrypting at least a portion of the real address includes refraining from encrypting lower order bits of the real address utilized to specify an address within a memory page.

6. The method of claim 1, further comprising combining additional data with the at least a portion of the real address prior to the encrypting.

7. The method of claim 6, wherein the additional data includes at least bits from a process address space identifier of the requestor.

8. The method of claim 6, wherein the additional data includes a read-only field indicating whether access to the real address by the requestor is read-only.

9. A data processing system, comprising:
   a processor configured to perform:
     receiving, from a requestor, a first request containing a virtual address;
     based on the first request, determining a real address corresponding to the virtual address, encrypting at least a portion of the real address to obtain a cryptographic secure real address, and returning the cryptographic secure real address to the requestor, wherein the encrypting includes:
  the processor maintaining a key generation field specifying a current key generation among a plurality of different key generations, said maintaining including repetitively cycling the key generation field through the plurality of different key generations over time;
  based on the current key generation specified by the key generation field, the processor selecting one of a plurality of different keys for use in the encrypting;
  the processor advancing the key generation field to specify a new key generation following the current key generation based on remapping of a virtual address space containing the virtual address;
  based on receiving a second request specifying a request address, decrypting the request address to validate the request address as the cryptographic secure real address; and
  based on validating the request address as the cryptographic secure real address, allowing access to a resource of the data processing system identified by the real address.

10. The data processing system of claim 9, wherein the receiving a first request includes receiving a Peripheral Component Interconnect Express Address Translation Services (PCIe ATS) protocol request.

11. The data processing system of claim 9, wherein encrypting at least a portion of the real address includes encrypting said at least a portion of the real address utilizing Advanced Encryption Standard (AES)-based encryption.

12. The data processing system of claim 9, wherein encrypting at least a portion of the real address includes generating a hash of said at least a portion of the real address.

13. The data processing system of claim 9, wherein encrypting at least a portion of the real address includes refraining from encrypting lower order bits of the real address utilized to specify an address within a memory page.

14. The data processing system of claim 9, wherein the processor is further configured to perform:
  combining additional data with the at least a portion of the real address prior to the encrypting.

15. The data processing system of claim 14, wherein the additional data includes at least bits from a process address space identifier of the requestor.

16. The data processing system of claim 14, wherein the additional data includes a read-only field indicating whether access to the real address by the requestor is read-only.

17. The data processing system of claim 9, further comprising:
  a system memory coupled to the processor; and
  the requestor coupled to the processor via a bus.

18. A program product, comprising:
a storage device; and
program code stored within the storage device, wherein the program code, when executed by a processor, causes the processor to perform:
  receiving, from a requestor, a first request containing a virtual address;
  based on the first request, determining a real address corresponding to the virtual address, encrypting at least a portion of the real address to obtain a cryptographic secure real address, and returning the cryptographic secure real address to the requestor, wherein the encrypting includes:
    the processor maintaining a key generation field specifying a current key generation among a plurality of different key generations, said maintaining including repetitively cycling the key generation field through the plurality of different key generations over time;
    based on the current key generation specified by the key generation field, the processor selecting one of a plurality of different keys for use in the encrypting;
    the processor advancing the key generation field to specify a new key generation following the current key generation based on remapping of a virtual address space containing the virtual address;
  based on receiving a second request specifying a request address, decrypting the request address to validate the request address as the cryptographic secure real address; and
  based on validating the request address as the cryptographic secure real address, allowing access to a resource of the data processing system identified by the real address.

19. The program product of claim 18, wherein the receiving a first request includes receiving a Peripheral Component Interconnect Express Address Translation Services (PCIe ATS) protocol request.

20. The program product of claim 18, wherein encrypting at least a portion of the real address includes encrypting said at least a portion of the real address utilizing Advanced Encryption Standard (AES)-based encryption.

21. The program product of claim 18, wherein encrypting at least a portion of the real address includes generating a hash of said at least a portion of the real address.

22. The program product of claim 18, wherein encrypting at least a portion of the real address includes refraining from encrypting lower order bits of the real address utilized to specify an address within a memory page.

23. The program product of claim 18, wherein the program code, when executed, causes the processor to perform:
  combining additional data with the at least a portion of the real address prior to the encrypting.

* * * * *